United States Patent [19]

Boylan

[11] Patent Number: 5,161,913

[45] Date of Patent: Nov. 10, 1992

[54] METHOD AND APPARATUS FOR MIGRATORY FISH PASSAGE TO THE SEA

[75] Inventor: Delmer R. Boylan, P.O. Box 572, Bruneau, Id. 83604

[73] Assignees: Eugene B. Campbell; Delmer R. Boylan, both of Bruneau, Id.

[21] Appl. No.: 822,672

[22] Filed: Jan. 21, 1992

[51] Int. Cl.⁵ .............................................. E02B 8/08
[52] U.S. Cl. .......................................... 405/83; 405/81
[58] Field of Search ..................... 405/52, 80, 81, 82, 405/83

[56] References Cited

U.S. PATENT DOCUMENTS

| | | | |
|---|---|---|---|
| 1,718,181 | 6/1929 | Province et al. | 405/81 |
| 2,381,100 | 8/1945 | Barr | 405/81 |
| 3,269,124 | 8/1966 | Leathers | 405/83 |
| 4,437,431 | 3/1984 | Koch | 405/83 |
| 4,629,361 | 12/1986 | Zimmerman | 405/83 |

FOREIGN PATENT DOCUMENTS

| | | | |
|---|---|---|---|
| 1030475 | 7/1983 | U.S.S.R. | 405/81 |
| 1500725 | 8/1989 | U.S.S.R. | 405/81 |

Primary Examiner—David H. Corbin
Attorney, Agent, or Firm—Paul F. Horton

[57] ABSTRACT

A method and apparatus for passing migratory fish by dams to the sea. The method includes the creation of a water flow within a main conduit and in one or more collection conduits flowing into the main conduit from spawning areas; lighting the interior of the tubes by artificial lights to attract the fish and keep the fish moving downstream within the conduits; and emptying the fish and water on the downstream side of a dam, preferably by siphoning the water and fish over the dam. The apparatus includes the collection conduits; the main conduit receiving input from the collection conduits; pumps for creating water flow; a lighting system within the conduits; a siphon over the dam; and an open flume for non-pressurized passage of the fish down to the downstream level below the dam. Where more than one dam is encountered, the flume empties into a continuation of the main conduit which, eventually, empties into a screened enclosure for acclimating the fish to brackish waters, while preventing feeding by predators. The apparatus may also include trash deflectors over the entries to the collection conduits; monitors; oxygenators; and rest areas.

22 Claims, 4 Drawing Sheets

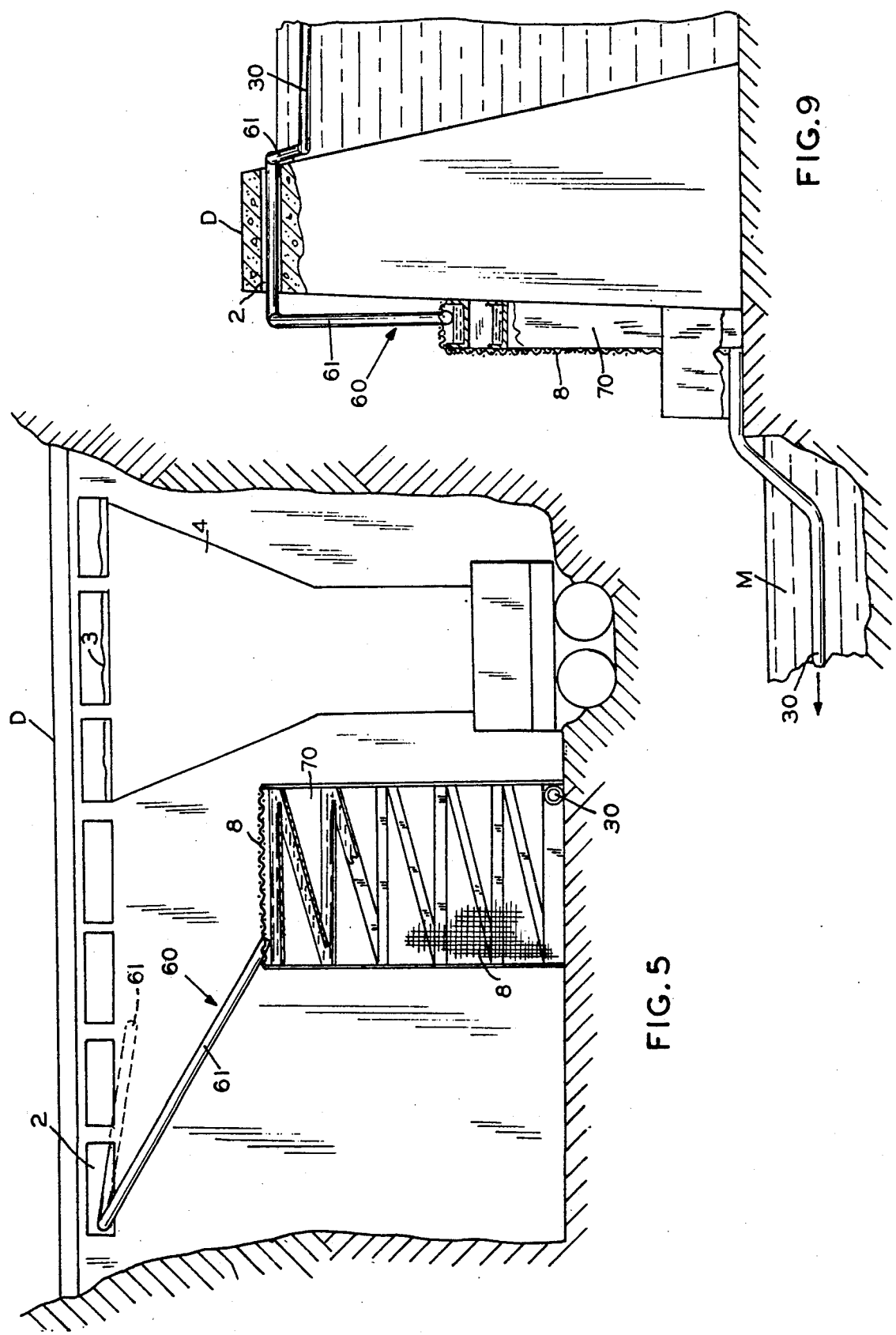

METHOD AND APPARATUS FOR MIGRATORY FISH PASSAGE TO THE SEA

BACKGROUND OF THE INVENTION

1. Field of the Invention

This invention relates to methods and apparatus for transporting ocean bound migratory fish from spawning streams to the brackish waters of a tidal basin.

2. Description of the Prior Art

Salmon and steelhead depend on great rivers like the Snake and Columbia for their passage ways to and from the ocean. The wonderful Northwestern country, with its maze of rivers and tributaries stretch across three states and extend into two more. These streams and hundreds of smaller tributaries are both the beginning and the final life cycle for these anadromous fish. Although they spend only two years of their life in the ocean, this cycle is critical to their survival as a species. Salmon and steelhead flourished hundreds of years before man built obstructions across these rivers. These dams however, gave us new living standards by furnishing hydro-electrical power and water for our crops. Although these dams are obviously a very desirable resource, their presence limits the passage of the species to complete their 5.5 year life cycle. The lack of an adequate system to allow this passage has greatly reduced and endangered one of our greatest natural resources.

There is currently, and has been for some time, a critical need to provide a method and apparatus which will successfully transport young migratory fish, also known as fry, fingerlings, and smolt, from their spawning grounds, over, often a series of dams, and to the ocean.

Presently, fish are simply released and are expected to find their way, through fish ladders, to the ocean. Very few make it. The overwhelming mass of fish being destroyed by the hydroelectric turbines of the dam. Those that aren't, become easy prey for predators, both fish and bird, as they linger in and become accustomed to the brackish waters, before entering the sea.

Efforts to solve this problem have resulted in several conduit systems for transporting fish, best typified by the excellent efforts of D. L. Koch, U.S. Pat. No. 4,437,431 and R. J. Zimmerman, U.S. Pat. No. 4,629,361.

Koch described and claims a system including conduits for receiving fish, located with the reservoir of a dam; the creation of an artificial stream within the conduits; and an extension of the conduit over or around the dam, terminating into the tailrace area downstream of the dam.

Zimmerman describes a system, devoid of mechanical devices, which extends past dams or other obstructions below and parallel with the surface of the stream. While ideal in many respects, Zimmerman's system is impractical for existing dams with hydroelectric capabilities because of cost of building a system that would be stream level through or around the dam.

Both Zimmerman and Koch recognize the problem of enticing fish to enter a dark passageway and both suggest the use of transparent conduits to solve this problem. This solution, however, is seriously flawed in that the fish will return to the intake of the conduit upon coming to areas of darkness. When the stream or reservoir waters are murky; where the conduit is located too far below the water surface; and where silt, algae, and debris cling to the top surface of the conduit, insufficient light enters the pipe and fish refuse further downstream movement.

SUMMARY OF THE INVENTION

The present invention is applicable to any river or stream that has obstructions or dams built across them which impede or prevent the fish from migrating. The system of the present invention needs no right-of-way, for it uses the river, itself. It does not interfere with surface traffic, such as barges and will have only minimal impact on recreational uses. Its course does not have to pass through or around a dam where the risks and costs can outweigh the advantages. The system includes a continuous pipeline system that collects the smolt near their natal spawning grounds and moves them, by pumping action and siphoning, to and over each dam; then carefully lowers them, by open flume, back to the main course of the river.

It is, therefore, a primary object of the present invention to provide a conduit system that will favor the anadromous fish species and their biological needs and convey the smolt from near their natal spawning grounds to the brackish waters of a tidal basin.

Another object of the present invention is to provide protection from predators during their journey to the sea.

An additional object of the present invention is to provide and maintain a uniform water chemistry throughout their journey and to protect the smolt from the pollutants, now abundant in our major rivers.

Still another object of the present invention is to provide predator protected open flumes from the top of the dam to the downstream water level below the dam.

It is also an object of the present invention, for cost efficiency to siphon fish and water over dams.

Also an object of the present invention is to provide protection for smolt as they acclimate themselves to brackish waters.

Additional objects and advantages will become apparent and a more thorough and comprehensive understanding may be had from the following description taken in conjunction with the accompanying drawings forming a part of this specification.

BRIEF DESCRIPTION OF THE DRAWINGS

FIG. 5 is a view of the backside of a dam showing the siphon, flume, and reconnection of the flume to the main conduit.

FIG. 9 shows a side view of the dam by-pass system.

DETAILED DESCRIPTION OF THE INVENTION

Figure 1:
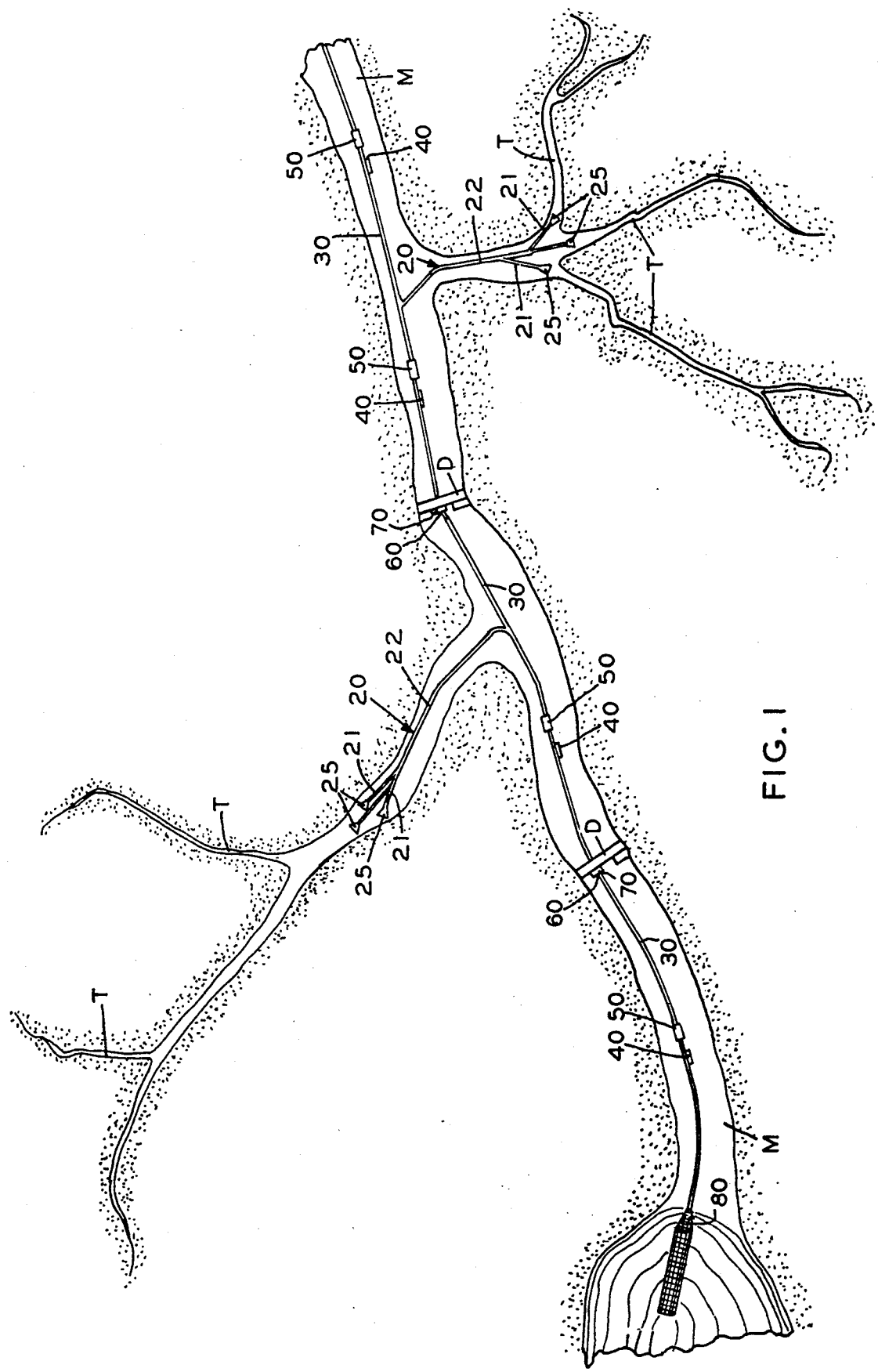
FIG. 1 is a generalized schematic of the fish passage apparatus of the present invention, in place.

Referring now to the drawings, and, more particularly, to FIG. 1, an overall embodiment to be preferred of apparatus for transporting migratory fish from their spawning grounds, over dams, and to a brackish water area for release, is shown to advantage.

The apparatus includes, generally, collection conduit means, designated generally by the numeral 20; a main conduit 30; one or more pump stations 40; rest areas 50; dam by-pass means 60, flowing into flumes 70; and the main conduit finally terminating in a brackish water enclosure 80, from which the fish exit to the sea.

Collection conduit means 20 includes at least one and preferably numerous fish reception conduits 21 located adjacent the spawning grounds on various tributaries "T" of a primary river or rivers "M". Reception conduits 21 may lead into progressively larger secondary conduits 22, terminating in fluid connection with the main conduit 30.

Figure 2:
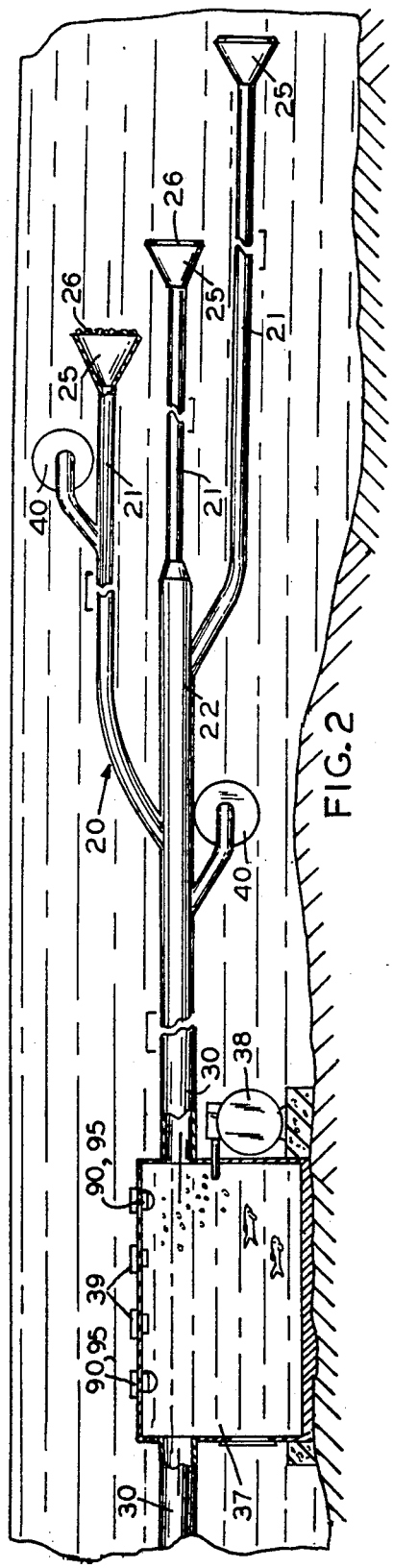
FIG. 2 is a sectional schematic showing a collection conduit entering the main conduit and showing pumps, monitors, lights, rest area, and oxygenator.
Figure 4:
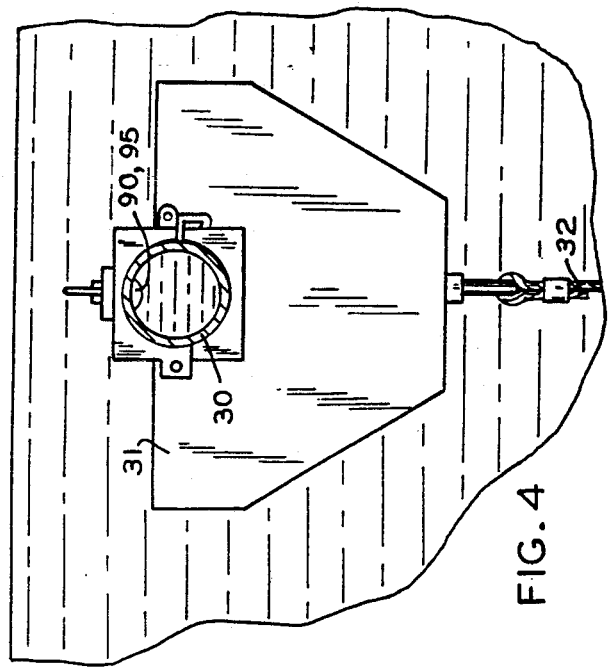
FIG. 4 shows the main conduit, flotation member, and a portion of a retention cable of FIG. 3, in partial section.

Referring now to FIG. 2, taken in conjunction with FIG. 1, collection conduit means 20 and main conduit 30, are shown to advantage. Each reception conduit 21, preferably constructed of flexible, transparent pipe approximately four inches in diameter, is provided on its terminal, fish receiving end with fish guide funnels 25, each having a trash deflector 26, such as mesh, bars, or the like, extending over its opening. The reception conduits will be set in the migrating routes of the fish. Intake pumps 40 are hooked to the flexible conduits to increase speed of water flow to guide fish into the conduit. It is to be noted that water drawn by pumps 40, is water in which the fry and fingerlings have lived; is the water which carries the natal water chemistry; and is water substantially free from the pollution of the rivers.

Figure 8:
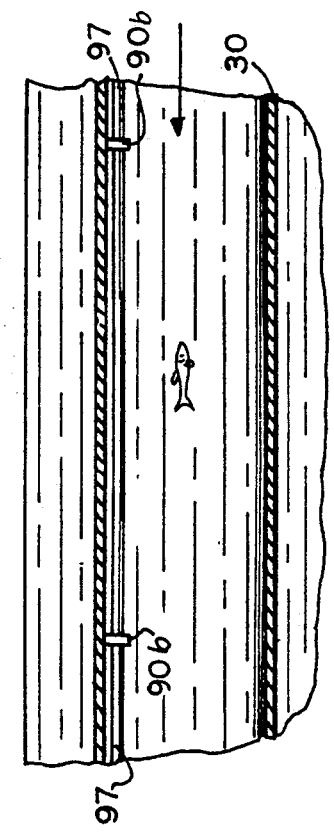
FIG. 8 shows a second embodiment of the light system, employing optical fibers for light conduction.
Figure 7:
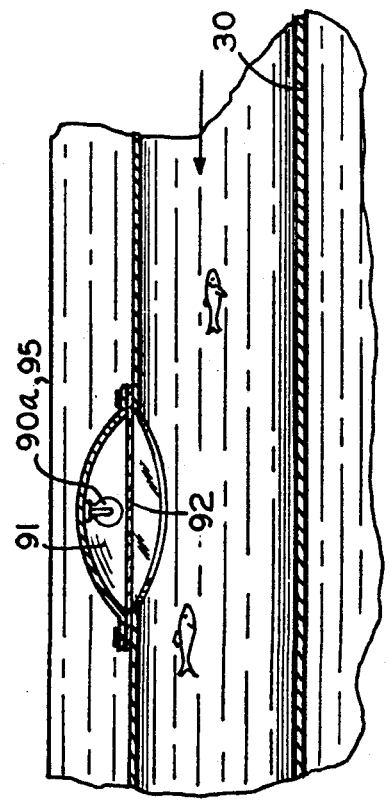
FIG. 7 shows one embodiment of an artificial light system, in section, for lighting the interior of the conduits of the invention.

To assist in guiding the fish into the reception conduits and to keep them moving downstream within the collection conduits, a novel lighting means has been devised. In that fish will turn back from dark areas, a series of "lamps" 90 are strung along the entire length of the main conduit and, preferably also in the collection conduits. The lamp units, as shown to advantage in FIGS. 2, 4, 7, and 8, may be mounted directly to the interior surface of the conduits or may be self contained, water proof units affixed to the exterior surface of the conduits, shining into the conduits through transparent glass or plastic windows in the conduits. One preferred embodiment, shown in FIG. 7, includes incandescent bulbs 90a, mounted within a water proof housing 91, extending into the conduit and illuminating the interior of the conduit through window 92. Power lines 95 from a conventional power source, not shown, are strung externally of the conduits to provide electricity for lighting the bulbs. A second embodiment, shown in FIG. 8, includes a fiber optic cable 97 carrying light from a light source, also not shown, with light terminals 90b spaced at selected distances along the length of the conduits. It is then, in this broad scope, that the term "lamps" is used. The light source for the optic fibers may be the sun or may be artificially generated light, the system being considered "artificial" in its broadest context.

Coursing down the river or rivers "M" and through reservoirs created by dams "D", is the main conduit 30, receiving, along the course, the many connections from the collection conduits. The diameter of the main conduit is determined by the total flow from the collection conduits and the length, of course, is determined by the distance from the entry of the first collection conduit to the brackish water area. The main conduit is considered to include all fish and water conduit within the main waterways, which may be for transportation of fish over a single dam or may include reconnections to the open flumes transporting the fish down the backside of a dam, as shown in FIG. 5. The main conduit is preferably transparent or translucent for receiving sunlight, where available, to assist in the lighting means of the present invention, but may be opaque.

Figure 3:
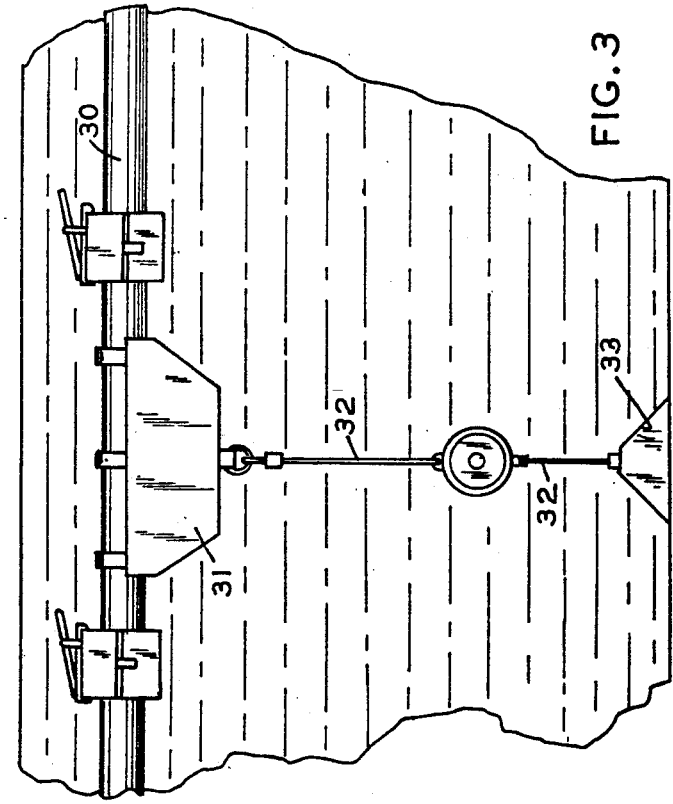
FIG. 3 shows a section of the main conduit with means for holding the conduit in place in deep water.

The main conduit 30 may rest on the bed of the river, but in rivers exceeding a depth of approximately 20 feet and in reservoirs, the main conduit may be held approximately 20 feet below the water surface by flotation members 31 and by tension reel lines 32 held to the river or reservoir bed by cement anchors 33. See FIGS. 3 and 4.

For counting fish, observing the fish, and checking water conditions, monitoring means, designated by the numeral 39, and shown in FIG. 2, may be provided as desired at selected locations along the length of the main conduit. A window within the main tube may serve to observe and count fish. An automatic fish counter and temperature, acidity, oxygen, and other sensors may also be employed. In that the fish continually swim against the current, it is also important that rest areas 37 be provided at selected intervals along the length of the main conduit. Such rest areas are expanded areas and volumes of the main conduit and are closed to outside water, predators and contaminants. Also provided in the main conduit and preferably at rest areas 37, are oxygenators 38 for controlled oxygenation of the water. Feeders, not shown, may also be provided in the rest areas.

Referring to FIGS. 1 and 5, means 60 for by-passing dam "D", may be seen. For by-passing the dam, a siphon pipeline 61, connected on the reservoir side of the dam to main conduit 30 and extending over the dam, as through spill window 2, located above the normal surface 3 of the reservoir water, shown by a wavy line at the top of spillway 4, is provided. Siphon pipeline 61 terminates on the downstream side of the dam into an open flume 70 for transporting water and fish to the stream level below the dam. It is to be appreciated that the siphon serves to "pull" water and fish over the dam from the closed system of the main conduit 30, thus easing the burden on pumps 40, for superior operating efficiency. The open flume, trough-like in construction, allows the fish to complete the journey to the bottom of the dam without having to survive the great pressure that would be involved in a closed flume. The flume may be spiraled from top to bottom or may traverse across the back face of the dam. The flume is entirely screened by screen 8, shown only in part in FIG. 5, to prevent birds from feeding upon the smolt.

Figure 6:
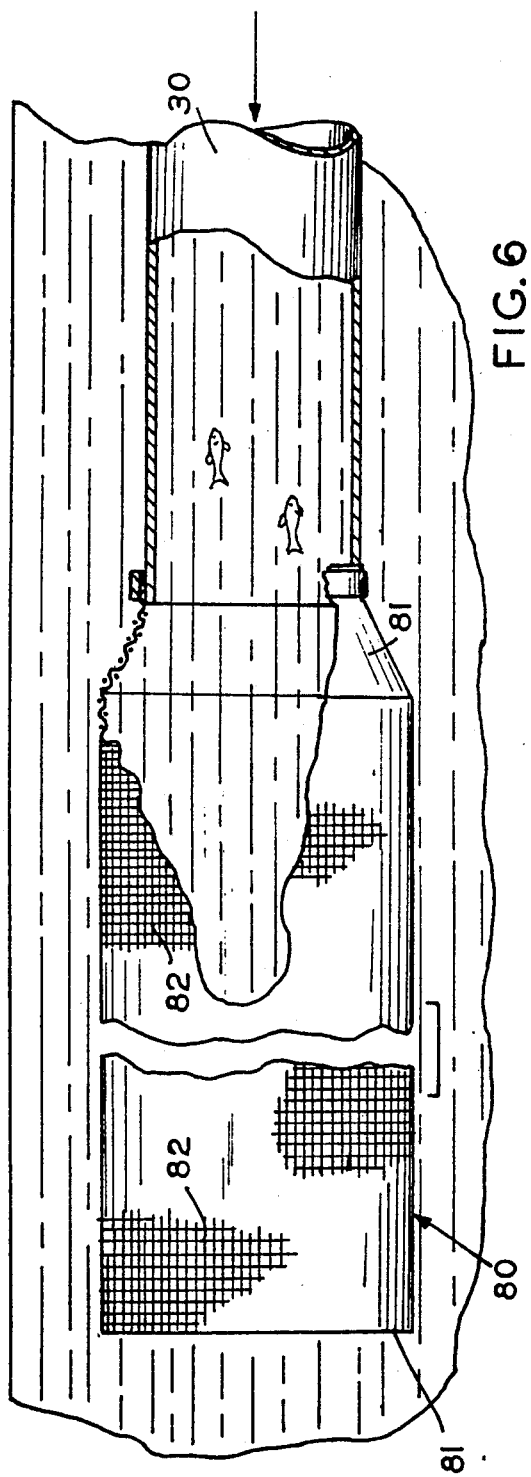
FIG. 6 shows a portion of one embodiment of the brackish water enclosure of the present invention.

Should another dam or obstruction need to be by-passed, the bottom of the flume is reconnected to an extension of the main conduit 30 for transporting the fish on toward the ocean, as is shown in FIG. 5. If, however, no further dams are to be by-passed in the downstream migration, and if brackish waters are nearby, the flume 70 or main conduit 30 empties into a brackish water enclosure 80, best seen in FIGS. 1 and 6. In that the smolt, upon entering brackish waters are quite listless and, in effect, semi-comatose, and require time to acclimate to the salt water, an elongated conduit 81, substantially similar to main conduit 30 may be provided. However, unlike the main conduit, conduit 81 is provided with a multiplicity of openings of a size to allow for exchange of water between the natal waters and the brackish water, but, at the same time to prevent entry of predatory fish or birds, or other predators. Screen or mesh 82 about the enclosure may be used for this purpose. Brackish water enclosure 80 may terminate in a large number of exits, each screened to a size to permit release of the smolt to the sea, but small enough to prevent larger predators from entering the enclosure.

Having thus described in detail a preferred selection of embodiments of the present invention, it is to be appreciated and will be apparent to those skilled in the art that many physical changes could be made in the apparatus without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

I claim:

1. A method for transporting migratory fish downstream of a dam comprising the steps of:
    creating a downstream water flow in collection conduit means at least partially by pump for attracting fish into and down the collection conduit means;
    causing water flow within said collection conduit means to be directed into a main water conduit for transporting fish and water into said main water conduit;
    lighting the interior of said main water conduit at selected intervals within said main conduit by artificial light means for attracting fish downstream; and
    emptying the water and fish within said main conduit on the downstream side of the dam.

2. The method as set forth in claim 1 further comprising the step of diverting trash from entering said collection conduit means by trash deflecting means.

3. The method as set forth in claim 1 further comprising the step of monitoring fish within said main conduit.

4. The method as set forth in claim 1 further comprising the step of oxygenating the water within said main conduit.

5. The method as set forth in claim 1 further comprising the step of providing a rest area for the fish within said main conduit.

6. The method as set forth in claim 1 further comprising the step of collecting fish exiting said main conduit on the downstream side of the dam and conveying fish to the water level below the dam by means of an open flume.

7. The method as set forth in claim 1 further comprising the step of protecting fish exiting the main conduit into brackish water by means of a brackish water enclosure.

8. The method as set forth in claim 1 further comprising the step of lighting said collection conduit means by artificial light means for attracting the fish downstream.

9. Apparatus for transporting migratory fish downstream of a dam comprising:
    collection conduit means for receiving water and fish;
    a main conduit in fluid communication with said collection conduit means for receiving the fish and water therefrom;
    pump means for providing water flow downstream within said collection conduit means and said main conduit;
    main conduit artificial lighting means for providing light within said main conduit for attracting fish downstream within said main conduit; and
    dam by-pass means for transporting fish and water received from said main conduit to the downstream side of the dam.

10. The apparatus as described in claim 9 wherein said main conduit artificial lighting means comprises a power source and a series of lamps, powered by said source, said lamps located at selected distances along the length of said main conduit.

11. The apparatus as described in claim 9 wherein said dam by-pass means comprises a siphon tube in closed fluid communication with said main conduit for siphoning water and fish over the dam.

12. The apparatus as described in claim 11 further comprising an open flume for transporting the water and fish to a selected location and level below the dam.

13. The apparatus as described in claim 9 further comprising collection conduit lighting means for attracting fish downstream within said collection conduit means.

14. The apparatus as described in claim 9 wherein said collection conduit means comprises a plurality of collection tubes, each provided with trash deflector means.

15. The apparatus as described in claim 9 wherein said main conduit includes at least one rest area of expanded volume and in closed communication with said main conduit to permit fish to rest.

16. The apparatus as described in claim 9 wherein said main conduit is provided with oxygenation means for oxygenating water within said main conduit.

17. The apparatus as described in claim 9 wherein said main conduit is provided with monitoring means for monitoring fish and water.

18. The apparatus as described in claim 9 further comprising a brackish water enclosure at the seaward terminal end of said main conduit.

19. Apparatus for transporting migratory fish downstream of a dam comprising:
    collection conduit means for receiving water and fish;
    a main conduit in fluid communication with said collection conduit means for receiving the fish and water therefrom;
    pump means for providing water flow downstream within said collection conduit means and said main conduit;
    main conduit artificial lighting means for providing light within said main conduit for attracting fish downstream within said main conduit;
    a siphon tube in closed fluid communication with said main conduit for siphoning water and fish over the dam; and
    an open flume for receiving fish and water from said siphon tube and transporting the water and fish to a selected location and level below the dam.

20. The apparatus as described in claim 19 wherein said main conduit artificial lighting means comprises a power source and a series of lamps, powered by said source, said lamps located at selected distances along the length of said main conduit.

21. The apparatus as described in claim 19 wherein said main conduit artificial lighting means comprises a light source; a fiber optic cable; and a plurality of light terminals selectively spaced along the interior of said main conduit.

22. The apparatus as described in claim 19 further comprising a brackish water enclosure at a seaward terminal end of said main conduit.

* * * * *